US010757677B2

(12) United States Patent
Kono et al.

(10) Patent No.: US 10,757,677 B2
(45) Date of Patent: Aug. 25, 2020

(54) RECORDING MEDIUM RECORDING BASE STATION DETERMINATION PROGRAM, INFORMATION PROCESSING APPARATUS, AND BASE STATION DETERMINATION METHOD

(71) Applicant: FUJITSU LIMITED, Kawasaki-shi, Kanagawa (JP)

(72) Inventors: Taki Kono, Kodaira (JP); Akira Kato, Yachiyo (JP); Kosei Takano, Fujimino (JP); Machiko Kawamura, Kawasaki (JP); Yukio Sato, Ota (JP); Kanami Hitsuda, Yokohama (JP); Teruaki Nakayama, Setagaya (JP); Hiroki Nikai, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 14 days.

(21) Appl. No.: 16/367,339

(22) Filed: Mar. 28, 2019

(65) Prior Publication Data
US 2019/0223143 A1 Jul. 18, 2019

Related U.S. Application Data

(63) Continuation of application No. PCT/JP2016/079130, filed on Sep. 30, 2016.

(51) Int. Cl.
*H04W 64/00* (2009.01)
*H04L 5/00* (2006.01)
(Continued)

(52) U.S. Cl.
CPC ......... *H04W 64/003* (2013.01); *H04L 5/0055* (2013.01); *H04W 4/025* (2013.01); *H04W 40/14* (2013.01); *H04W 72/0446* (2013.01)

(58) Field of Classification Search
CPC ...... H04B 7/185; H04B 10/11; H04B 10/112; H04B 13/02; H04B 17/309; H04W 4/025;
(Continued)

(56) References Cited

U.S. PATENT DOCUMENTS 3,540,048 A * 11/1970 Clemens, Jr. .......... H04B 7/185
342/352
8,254,913 B2 * 8/2012 Alcorn ................ H04B 7/1851
455/431
(Continued)

FOREIGN PATENT DOCUMENTS

CN 102917369 A * 2/2013
CN 106597499 A * 4/2017
(Continued)

OTHER PUBLICATIONS

Bai et al., Over-the-Sea Radio Propagation and Integrated Wireless Networking for Ocean Fishery Vessels, Aug. 1, 2011, Wireless Communications and Applications: First International Conference, ICWCA 2011, pp. 180-190 (Year: 2011).*
(Continued)

*Primary Examiner* — Eric Nowlin
(74) *Attorney, Agent, or Firm* — Fujitsu Patent Center

(57) ABSTRACT

A non-transitory computer-readable recording medium having stored therein a base station determination program for causing a computer to execute a process includes: acquiring position information on a communication terminal; assigning, based on position information on each of a plurality of base stations stored in advance in a storage and the acquired position information on the communication terminal, one or more base stations other than a base station that includes a point at which a radio wave characteristic based on longitude information changes in a time slot during which communication is to be performed, and which is provided between a position of the base station and a position of the
(Continued)

communication terminal, as one or more base station candidates from among the plurality of base stations; and determining a base station that is to communicate with the communication terminal from among the one or more base station candidates.

20 Claims, 12 Drawing Sheets

(51) Int. Cl.
*H04W 4/02* (2018.01)
*H04W 72/04* (2009.01)
*H04W 40/14* (2009.01)

(58) Field of Classification Search
CPC ............... H04W 40/14; H04W 64/003; H04W 72/0446
See application file for complete search history.

(56) References Cited

U.S. PATENT DOCUMENTS

| | | | | |
|---|---|---|---|---|
| 8,531,316 | B2* | 9/2013 | Velado | B63J 99/00 340/984 |
| 9,423,495 | B1* | 8/2016 | Chang | H01Q 7/00 |
| 9,848,025 | B2* | 12/2017 | Goldin | H04L 67/18 |
| 10,020,861 | B2* | 7/2018 | Moshfeghi | H04B 7/12 |
| 10,045,227 | B2* | 8/2018 | Rao | H04W 16/28 |
| 10,178,642 | B1* | 1/2019 | Posner | H04W 60/04 |
| 10,333,888 | B2* | 6/2019 | Yun | H04L 61/2007 |
| 2005/0159151 | A1* | 7/2005 | Eckelt | B64D 11/0624 455/431 |
| 2007/0264930 | A1* | 11/2007 | Daoudal | H04B 7/18506 455/3.02 |
| 2009/0279490 | A1* | 11/2009 | Alcorn | H04B 7/1851 370/329 |
| 2011/0095914 | A1* | 4/2011 | Velado | G08B 25/008 340/984 |
| 2013/0163516 | A1* | 6/2013 | Baek | H04B 7/1851 370/328 |
| 2014/0010155 | A1* | 1/2014 | Kim | H04W 40/20 370/328 |
| 2014/0045541 | A1* | 2/2014 | Moshfeghi | H04B 17/336 455/500 |
| 2014/0153674 | A1 | 6/2014 | Stratigos, Jr. | |
| 2014/0266793 | A1* | 9/2014 | Velado | G08B 25/08 340/870.16 |
| 2016/0173360 | A1* | 6/2016 | Goldin | H04L 65/7046 455/430 |
| 2016/0212681 | A1 | 7/2016 | Linden et al. | |
| 2017/0156052 | A1* | 6/2017 | Yun | H04L 61/2053 |
| 2017/0230841 | A1* | 8/2017 | Rao | H04W 16/28 |
| 2018/0375564 | A1* | 12/2018 | Moshfeghi | H04W 84/00 |
| 2019/0098598 | A1* | 3/2019 | Posner | H04W 60/04 |
| 2019/0222292 | A1* | 7/2019 | Moshfeghi | H04L 7/033 |
| 2019/0222472 | A1* | 7/2019 | Kono | H04W 16/28 |
| 2019/0223143 | A1* | 7/2019 | Kono | H04L 5/0055 |
| 2019/0306729 | A1* | 10/2019 | Lopes | H04L 67/125 |

FOREIGN PATENT DOCUMENTS

| | | | | |
|---|---|---|---|---|
| CN | 107454571 | B | * | 4/2019 |
| CN | 110381437 | A | * | 10/2019 |
| GB | 2016-506122 | | | 2/2016 |
| JP | 55-147842 | | | 11/1980 |
| JP | 7-322352 | | | 12/1995 |
| JP | 2012-244274 | | | 12/2012 |
| KR | 20140005438 | A | * | 1/2014 ........... H04B 7/1851 |
| KR | 101614519 | B1 | * | 4/2016 ......... H04L 61/2053 |

OTHER PUBLICATIONS

Boreli et al., Intelligent Middleware for High Speed Maritime Mesh Networks with Satellite Communications, Oct. 20, 2009, IEEE, 2009 9th International Conference on Intelligent Transport Systems Telecommunications, (ITST), DOI: 10.1109/ITST.2009.5399327 (Year: 2009).*
Choi et al., Ship to Ship Maritime Communication for e-Navigation Using IEEE 802.16j, Oct. 30, 2013, Computer, Information and Application 2013, DOI: 10.14257/astl.2013.28.21 (Year: 2013).*
Ge et al., Connectivity and Route Analysis for a Maritime Communication Network, Dec. 10, 2007, IEEE, 2007 6th International Conference on Information, Communications & Signal Processing, DOI: 10.1109/ICICS.2007.4449621 (Year: 2007).*
Hui et al., Design of Radio Transmission Technologies for VHF Band Ship Ad-hoc Network, Sep. 28, 2011, ICTC 2011, Seoul, pp. 626-629, doi: 10.1109/ICTC.2011.6082674 (Year: 2011).*
Jo et al., LTE-Maritime: High-Speed Maritime Wireless Communication based on LTE Technology, Apr. 22, 2019, IEEE, IEEE Access, DOI: 10.1109/ACCESS.2019.2912392 (Year: 2019).*
Kong et al., A Routing Protocol for WiMAX Based Maritime Wireless Mesh Networks, May 29, 2009, IEEE, IEEE 69th Vehicular Technology Conference (VTC Spring 2009), DOI: 10.1109/VETECS.2009.5073337 (Year: 2009).*
Yau et al., Maritime Networking: Bringing Internet to the Sea, Apr. 9, 2019, IEEE, IEEE Access, vol. 7, DOI: 10.1109/ACCESS.2019.2909921 (Year: 2019).*
Zhou et al., Triton: High-Speed Maritime Wireless Mesh Network, Oct. 2013, IEEE, IEEE Wireless Communication, DOI: 10.1109/MWC.2013.6664484 (Year: 2013).*
International Search Report attached with the Written Opinion of the International Searching Authority, mailed in connection with PCT/JP2016/079130 and dated Dec. 6, 2016, with partial English translation (10 pages).

* cited by examiner

FIG. 4

| MESSAGE ID | ACK | MESSAGE LENGTH | SHIP ID | LATITUDE | LONGITUDE | HEIGHT ABOVE SEA LEVEL | GMT | ... |

FIG. 6

| MESSAGE ID | TRANSFER SPEED (bps) | FREQUENCY (MHz) | BASE STATION ID | TRANSMISSION DATE AND TIME | COMMUNICATION STATUS (BY SHIP ID) | | | |
|---|---|---|---|---|---|---|---|---|
| | | | | | 001A | 002A | 003A | ... |
| A01 | 125 | 27 | A | 2015.01.29 21:11:00 | I1, I2, yy.mm.dd hh:mb:ss, (x,y) | I1, I2, yy.mm.dd hh:mb:ss, (x,y) | | |
| | | | B | 2015.01.29 21:11:00 | I1, I2, yy.mm.dd hh:mb:ss, (x,y) | | I1, I2, yy.mm.dd hh:mb:ss, (x,y) | |
| | | | ... | | | | | |
| A02 | 100 | 20 | A | 2015.01.29 22:00:00 | | I1, I2, yy.mm.dd hh:mb:ss, (x,y) | | |
| | | | B | 2015.01.29 22:00:00 | I1, I2, yy.mm.dd hh:mb:ss, (x,y) | I1, I2, yy.mm.dd hh:mb:ss, (x,y) | I1, I2, yy.mm.dd hh:mb:ss, (x,y) | |
| | | | ... | | | | | |
| ... | | | | | | | | |

| BASE STATION ID | POSITION INFORMATION | COMMUNICATION INSTRUMENT TYPE NAME | BAND (MHz) | | | | | | | |
| --- | --- | --- | --- | --- | --- | --- | --- | --- | --- | --- |
| | | | 4 | 8 | 12 | 16 | 22 | 27 | VHF | ... |
| A | (xA,yA) | xxxxxx | 2 | 2 | | | | 1 | 1 | |
| B | (xB,yB) | xxxxxx | | 2 | 1 | 1 | 1 | | | |
| ... | | | | | | | | | | |

24

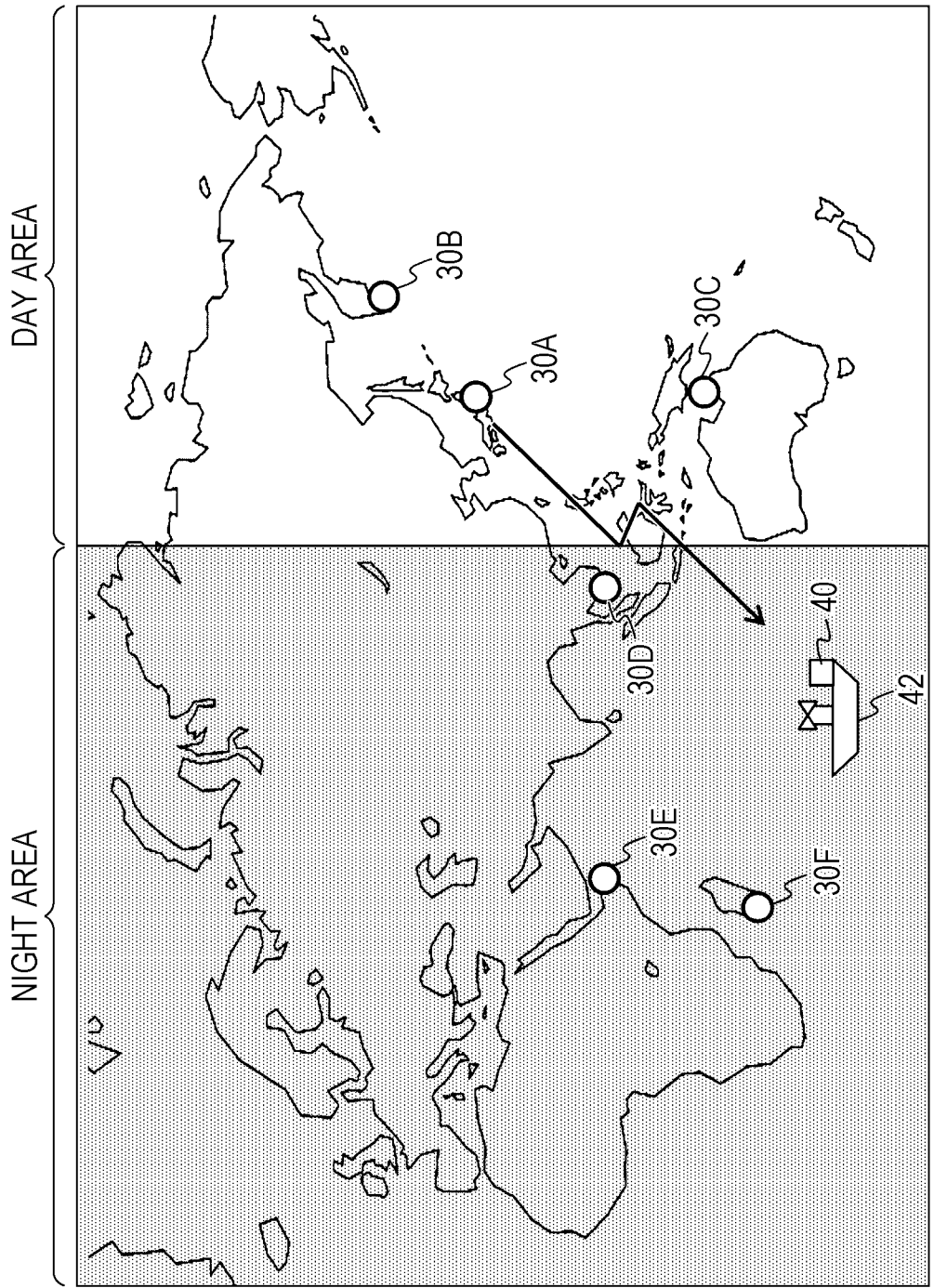

FIG. 9

BASE STATION C
BASE STATION B
BASE STATION A
☐ FREQUENCY XXX Mhz    ☐ DATE: DD, MM, 2015 (DAY OF WEEK)
■ POINT No. TABLE

| HORIZONTAL AXIS: LATITUDE VERTICAL AXIS: LONGITUDE | 0 | 10 | 20 | 30 | 40 | 50 | 60 | 70 | 80 | ........ |
|---|---|---|---|---|---|---|---|---|---|---|
| 0 | 1 | 37 | 74 | 111 | 148 | 185 | 222 | 259 | 296 | |
| 10 | 2 | 38 | 75 | 112 | 149 | 186 | 223 | 260 | 297 | |
| 20 | 3 | 39 | 76 | 113 | 150 | 187 | 224 | 261 | 298 | |
| 30 | 4 | 40 | 77 | 114 | 151 | 188 | 225 | 262 | 299 | |
| 40 | 5 | 41 | 78 | 115 | 152 | 189 | 226 | 263 | 300 | |
| 50 | 6 | 42 | 79 | 116 | 153 | 190 | 227 | 264 | 301 | |
| 60 | 7 | 43 | 80 | 117 | 154 | 191 | 228 | 265 | 302 | |
| 70 | 8 | 44 | 81 | 118 | 155 | 192 | 229 | 266 | 303 | |
| 80 | 9 | 45 | 82 | 119 | 156 | 193 | 230 | 267 | 304 | |
| 90 | 10 | 46 | 83 | 120 | 157 | 194 | 231 | 268 | 305 | |
| 10 | 11 | 47 | 84 | 121 | 158 | 195 | 232 | 269 | 306 | |
| 110 | 12 | 48 | 85 | 122 | 159 | 196 | 233 | 270 | 307 | |
| 120 | 13 | 49 | 86 | 123 | 160 | 197 | 234 | 271 | 308 | |
| 130 | 14 | 50 | 87 | 124 | 161 | 198 | 235 | 272 | 309 | |
| 140 | 15 | 51 | 88 | 125 | 162 | 199 | 236 | 273 | 310 | |
| 150 | 16 | 52 | 89 | 126 | 163 | 200 | 237 | 274 | 311 | |
| 160 | 17 | 53 | 90 | 127 | 164 | 201 | 238 | 275 | 312 | |

■ COMMUNICATION QUALITY TABLE    COMMUNICATION STRENGTH  5: VERY GOOD  4: GOOD  3: 50%
2: POOR  1: VERY POOR  0: COMMUNICATION IMPOSSIBLE
*GREY PORTIONS HAVE NO COMMUNICATION LOGS

| HORIZONTAL AXIS: COORDINATED UNIVERSAL TIME VERTICAL AXIS: POINT No. | 0 | 1 | 2 | 3 | 4 | 5 | 6 | 7 | 8 | 9 | 10 |
|---|---|---|---|---|---|---|---|---|---|---|---|
| 1 |  | 2 |  |  |  | 3 | 4 | 4 | 4 | 5 |  |
| 2 |  | 3 | 3 | 3 | 4 | 4 | 4 | 5 | 5 | 5 | 5 |
| 3 |  | 3 | 4 | 4 | 4 | 5 | 5 |  | 4 | 4 | 4 |
| 4 | 4 | 4 | 4 | 5 | 5 | 5 |  |  | 4 |  | 3 |
| 5 | 3 | 3 | 3 | 3 | 3 | 3 |  |  | 4 | 4 | 3 |
| 6 | 3 | 3 | 3 | 3 | 3 | 3 |  |  | 4 | 3 | 3 |
| 7 | 4 | 4 | 5 | 5 | 5 |  |  |  | 3 | 3 | 5 | 5 |
| 8 | 4 | 4 | 5 | 5 | 5 |  |  | 3 | 3 |  | 5 |
| 9 | 4 | 3 | 5 |  | 5 |  |  | 3 | 3 |  | 5 |
| 10 | 3 |  | 3 |  |  |  |  | 3 | 2 |  | 5 |
| 11 | 3 |  | 3 |  |  |  | 3 | 3 | 2 |  | 5 |
| 12 | 3 | 3 | 3 |  |  |  | 3 | 3 | 2 |  | 5 | 5 |
| 13 |  | 3 | 3 | 3 | 2 | 3 | 2 | 2 | 2 | 5 | 5 |
| 14 |  | 2 |  | 3 | 3 | 3 | 2 | 2 | 1 | 5 | 5 |
| 15 |  | 2 |  |  | 3 | 3 | 2 | 1 | 1 | 5 | 5 |
| 16 | 2 | 1 |  |  | 3 | 3 | 3 | 1 | 1 | 0 | 5 |
| 17 | 1 | 1 |  |  | 3 | 3 |  |  | 0 | 0 |  | 5 |

# RECORDING MEDIUM RECORDING BASE STATION DETERMINATION PROGRAM, INFORMATION PROCESSING APPARATUS, AND BASE STATION DETERMINATION METHOD

CROSS-REFERENCE TO RELATED APPLICATION

This application is a continuation application of International Application PCT/JP2016/079130 filed on Sep. 30, 2016 and designated the U.S., the entire contents of which are incorporated herein by reference.

FIELD

The embodiments discussed herein are related to a base station determination program, a base station determination apparatus, and a base station determination method.

BACKGROUND

There is a technology for performing communication between a base station disposed at each of a plurality of principal localities defined in advance and a communication terminal present at an arbitrary location. In a case where reliable communication between the base station and the communication terminal is desired, it is conceivable to use satellite communication or the like, while a communication system using satellite communication is expensive. Accordingly, in order to perform communication over a long distance at low cost, a communication technique utilizing the reflection of radio waves at the ionosphere is used.

Japanese Laid-open Patent Publication No. 07-322352 and Japanese Laid-open Patent Publication No. 55-147842 are disclosed as related art.

SUMMARY

According to an aspect of the embodiments, A non-transitory computer-readable recording medium having stored therein a base station determination program for causing a computer to execute a process includes: acquiring position information on a communication terminal; assigning, based on position information on each of a plurality of base stations stored in advance in a storage and the acquired position information on the communication terminal, one or more base stations other than a base station that includes a point at which a radio wave characteristic based on longitude information changes in a time slot during which communication is to be performed, and which is provided between a position of the base station and a position of the communication terminal, as one or more base station candidates from among the plurality of base stations; and determining a base station that is to communicate with the communication terminal from among the one or more base station candidates.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of a data format of an acknowledgement (ACK);

FIG. 6 is a diagram illustrating an example of a communication record table;

FIG. 7 is a diagram illustrating an example of a base station table;

FIG. 8 is a diagram for explaining the distinction between a day and a night at positions of a ship carrying a communication terminal and each base station.

FIG. 9 is a diagram illustrating an example of communication quality tables;

DESCRIPTION OF EMBODIMENTS

Figure 1:
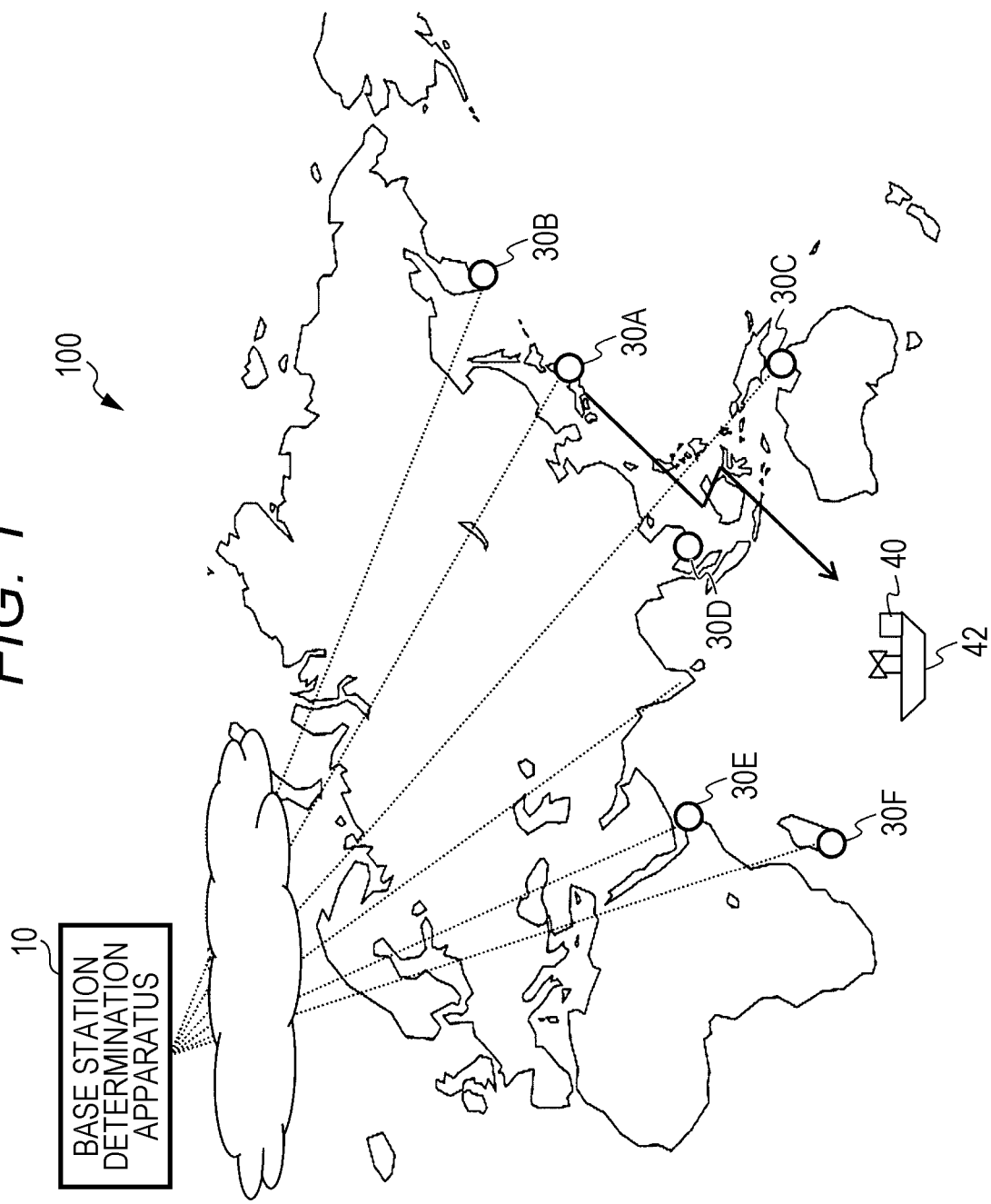
FIG. 1 is a diagram for explaining an outline of a communication system according to an embodiment of the present invention.

In the communication technique utilizing the ionospheric reflection, since the communication quality varies according to the condition of the ionosphere, reliable communication may not be implemented in some cases. Thus, in the communication technique utilizing the ionospheric reflection, technologies for improving the reliability of communication may be proposed.

For example, a technology for ensuring a good communication state may be proposed for a shortwave radio set to be carried on an aircraft, or the like. For example, the effective communication area from the position of a local station where the radio set is located when the frequency set in the radio set is used is calculated by utilizing database information such as state information on the ionosphere according to the season and time and geographical information. Meanwhile, when the coordinate data of the local station and the coordinate data of a counterpart station are input, the frequency of a radio wave suitable for the communication between the local station and the communication counterpart station is calculated and the calculated frequency is automatically set in the radio set.

A technology for maintaining the transmission quality when data transmission is performed between a ground fixed station and a mobile station moving across a wide service area at a relatively high speed, such as an aircraft or a watercraft, using a shortwave line with poor transmission quality also may be proposed. For example, when data is transmitted from the fixed station to the mobile station, the optimum transmission site is selected according to data of the optimum frequencies having, as parameters, the season, time, region, frequency, electric power, and the like collected over a past long time period for each activity location of the mobile body.

For example, in a method utilizing the state information on the ionosphere according to the season and the time, and the like, the frequency of the radio wave suitable for the communication between the local station and the communication counterpart station is automatically set in the radio set. However, when the communication from the local station fails, it becomes difficult to transmit the information to the communication counterpart station and the reliability of the communication deteriorates.

For example, in a method using data of the optimum frequencies having, as parameters, the season, time, region, frequency, electric power, and the like collected over a past long time period for each activity location of the mobile body, the optimum transmission site is selected from among transmission sites disposed over a wide region distributedly. However, depending on the activity location of the mobile body, there is a possibility that a position where sufficient communication logs have not been obtained is included and, when a mobile body at such a position is a communication destination, there is a possibility that an appropriate transmission site may not be selected.

For example, a base station capable of performing highly reliable communication even with a communication terminal at a position with inadequate communication logs may be determined.

Hereinafter, an example of embodiments according to the disclosed technology will be described in detail with reference to the drawings.

As illustrated in FIG. 1, a communication system 100 according to an embodiment includes a base station determination apparatus 10, base stations 30A, 30B, 30C, 30D, 30E, and 30F, and a communication terminal 40 carried on a ship 42, which is a mobile body. In the following description, when the base stations 30A, 30B, 30C, 30D, 30E, and 30F are explained without any distinction, these base stations are simply referred to as "base stations 30". FIG. 1 illustrates an example in which six base stations 30 and one communication terminal 40 are included in the communication system 100, but the number of base stations 30 and communication terminals 40 is not limited to the example in FIG. 1.

The base station determination apparatus 10 is an information processing apparatus such as a server or a personal computer provided on a cloud such as a data center. The base station 30 is an information processing apparatus having a communication function disposed in a facility of a fishery association or the like provided, for example, in a coastal area. The base station 30 and the base station determination apparatus 10 are mutually connected via a network such as the Internet. Radio communication utilizing reflection of radio waves of a shortwave band frequency (about 3 to 30 MHz) in the ionosphere is performed between the base station 30 and the communication terminal 40.

In the communication utilizing the ionospheric reflection, the radio wave characteristics are sometimes different depending on the longitudes of the positions of the base station 30 and the communication terminal 40 performing the communication. This is because there is a difference as to whether it is during the day or the night between respective points depending on a difference in longitude. In this example, a time period from sunrise to sunset will be assumed as a day and a time period from sunset to sunrise will be assumed as a night.

Figure 2:
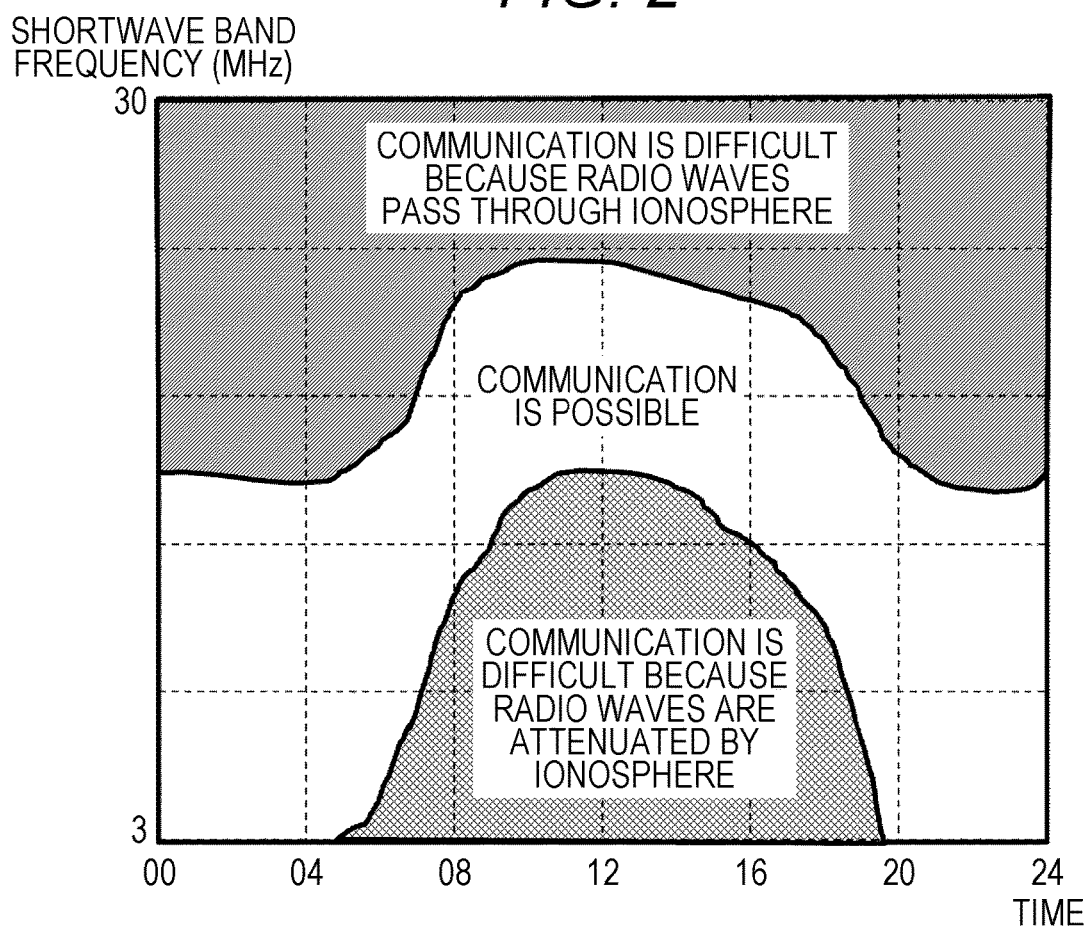
FIG. 2 is a diagram for explaining radio wave characteristics of communication by ionospheric reflection.

Since the state of the ionosphere is different between the day and the night, the communication state utilizing the ionospheric reflection is also different. For example, as illustrated in FIG. 2, radio waves of a relatively low frequency in the shortwave band are attenuated in a D layer where the electron density becomes dense during the day, before being reflected in an F layer, such that the communication by the ionospheric reflection becomes difficult; however, since the D layer disappears at night, good communication is enabled. Meanwhile, radio waves of a relatively high frequency in the shortwave band are well reflected in the F layer where the density becomes dense during the day, such that the communication state is good; however, radio waves pass through the ionosphere due to a decrease in the electron density in the F layer at night and a communication failure occurs. Therefore, when the distinction between the day and the night at the position of the base station 30 and the distinction between the day and the night at the position of the communication terminal 40 are different from each other, setting a frequency appropriate for both of the base station 30 and the communication terminal 40 is difficult and the communication quality deteriorates.

Accordingly, in the present embodiment, the base station determination apparatus 10 determines, as the base station 30 that is to transmit a message to the communication terminal 40, a base station 30 at which the distinction between the day and the night is the same as the distinction between the day and the night at the position of the communication terminal 40, which is the transmission destination of the message.

When transmitting a message to the communication terminal 40, the base station 30 transmits a message transmission request to the base station determination apparatus 10. The message transmission request includes identification information on the communication terminal 40 as a transmission destination, a base station ID which is identification information on the base station 30 (local device), and a message to be transmitted. In the present embodiment, a ship ID which is identification information on the ship 42 carrying the communication terminal 40 is used as the identification information on the communication terminal 40.

Figure 3:
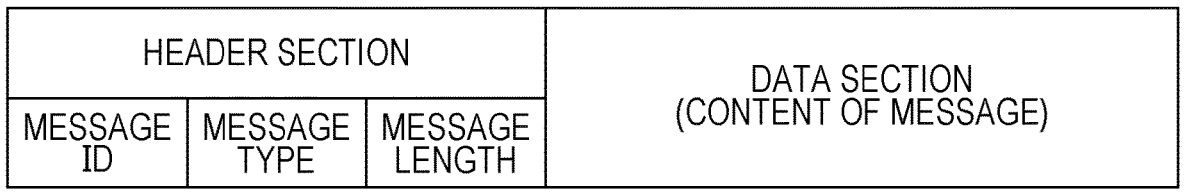
FIG. 3 is a diagram illustrating an example of a data format of a message.

Here, FIG. 3 illustrates an example of a data format of the message. In the example in FIG. 3, the message includes a header section containing a message ID which is identification information on the message, a message type, and a message length (data size of the message), and a data section indicating the content of the message. The message type represents a type according to the content of the message, such as a regular report, urgent communication, weather information, or an alarm.

In addition, when receiving a message transmission instruction transmitted from the base station determination apparatus 10, the base station 30 transmits a message designated by the message transmission instruction to the designated communication terminal 40 under designated communication conditions. Upon transmitting the message to the communication terminal 40, the base station 30 transmits, to the base station determination apparatus 10, a communication result indicating whether the transmission of the message to the communication terminal 40 was successful or failed, according to whether an ACK has been received from the communication terminal 40 within a predetermined time.

For example, when receiving the ACK from the communication terminal 40, the base station 30 transmits the communication result indicating that the transmission of the message was successful to the base station determination apparatus 10. The communication result indicating that the transmission of the message was successful includes, for example, the message ID of the transmitted message, communication conditions (transfer speed and frequency) at the time of transmitting the message, the base station ID of the local device, transmission date and time of the message, the ship ID of the ship 42 carrying the communication terminal 40 as the transmission destination, and a communication status. Examples of the communication status may include the reception strength at the time of receiving the ACK at the base station 30, and information included in the ACK transmitted from the communication terminal 40. The ACK includes, for example, information such as the reception strength at the time of receiving the message at the communication terminal 40, reception date and time, the position of the ship 42 at the time of receiving the message. As for the position of the ship 42, position information represented by latitude and longitude measured by a positioning system such as a global positioning system (GPS) carried on the ship 42 can be used.

FIG. 4 illustrates an example of the ACK. In the example in FIG. 4, the ACK includes information such as a message ID indicating which message is responded by the ACK, an identifier indicating that this data is an ACK, a message length, a ship ID of a ship carrying the communication terminal 40 that has transmitted the ACK, latitude, longitude, and Greenwich Mean Time (GMT).

Meanwhile, when the base station 30 does not receive the ACK from the communication terminal 40 even after the lapse of the predetermined time, the base station 30 transmits a communication result indicating that the transmission of the message failed to the base station determination apparatus 10. The communication result indicating that the transmission of the message failed includes the message ID of the message that failed in transmission and the ship ID of the ship 42 carrying the communication terminal 40 as the transmission destination.

Figure 5:
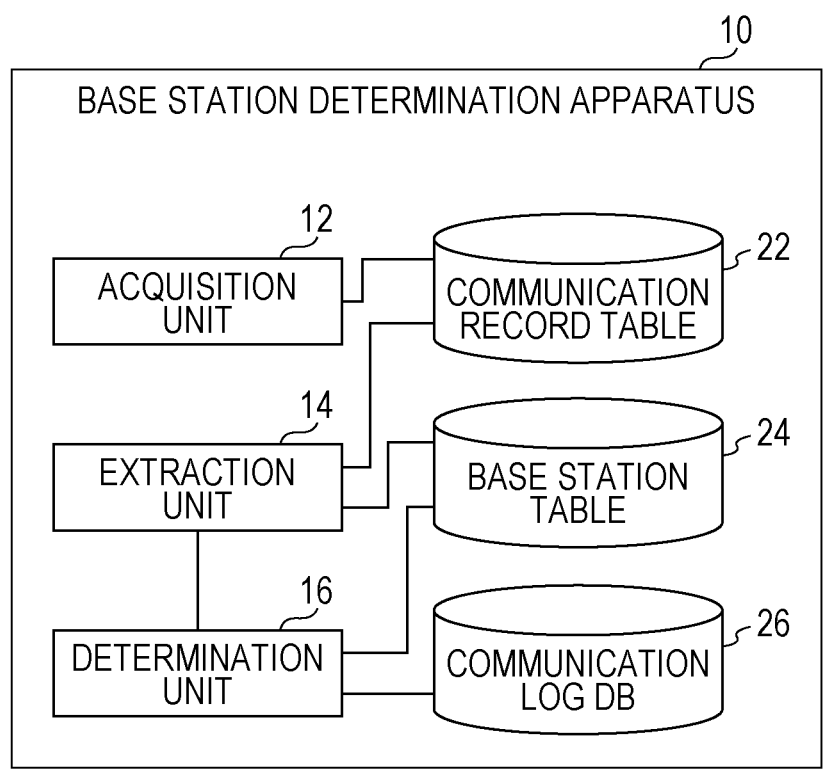
FIG. 5 is a functional block diagram of a base station determination apparatus according to the present embodiment.

As illustrated in FIG. 5, the base station determination apparatus 10 functionally includes an acquisition unit 12, an extraction unit 14, and a determination unit 16. A predetermined storage area of the base station determination apparatus 10 stores a communication record table 22, a base station table 24, and a communication log database (DB) 26. Note that the extraction unit 14 and the determination unit 16 are examples of a determination unit of the disclosed technology.

The acquisition unit 12 acquires the position information indicating the position of each of the communication terminals 40. In the present embodiment, it is assumed that the position information on the ship carrying the communication terminal 40 is identical to the position information on the communication terminal 40. For example, the acquisition unit 12 periodically causes each base station 30 to transmit a message in a predetermined pattern to each communication terminal 40 and acquires the position information on each communication terminal 40 from a communication result regarding the transmission of that message in a predetermined pattern.

In detail, for example, the acquisition unit 12 designates communication conditions including the transfer speed and the frequency at the time of transmitting the message and transmits, to each base station 30, the message transmission instruction for causing each base station 30 to transmit the message for periodically acquiring the position information to the communication terminal 40. Each base station 30 broadcasts the message under the communication conditions designated by the message transmission instruction. The communication terminal 40 that has received this message sends back the ACK, for example, as illustrated in FIG. 4, to the base station 30, which is the transmission source of the message and, in turn, the base station 30 transmits the communication result to the base station determination apparatus 10. As described earlier, the communication result transmitted from the base station 30 includes the information on the ACK transmitted from the communication terminal 40 and this ACK includes the position information on the ship 42 carrying the communication terminal 40. Thus, the acquisition unit 12 can acquire the position information on the communication terminal 40 by receiving the communication result.

The acquisition unit 12 stores the information included in the received communication result in association with each item of the communication record table 22, for example, as illustrated in FIG. 6. In the example in FIG. 6, the communication record table 22 includes items of "message ID" of the message for periodically acquiring the position information, the designated communication conditions ("transfer speed" and "frequency"), "base station ID" of the base station 30 that has transmitted the message, and "transmission date and time" of the message. In addition, "communication status" between each base station 30 and the communication terminal 40 is also stored in the communication record table 22 in association with the ship ID of the ship 42 carrying each communication terminal 40. FIG. 6 illustrates an example in which the reception strength of the ACK at the base station 30, the reception strength of the message at the communication terminal 40, the reception date and time, and the reception position are stored in order as "communication status".

The communication record table 22 may also store information on a communication result regarding the transmission of a message other than the message for periodically acquiring the position information.

The extraction unit 14 receives the message transmission request transmitted from the base station 30. Then, on the basis of the position of each of the plurality of base stations 30 and the position of the communication terminal 40 as the transmission destination of the message, the extraction unit 14 extracts a base station candidate which is a candidate of a base station 30 that is to be caused to transmit the message, from the plurality of base stations 30.

For example, the extraction unit 14 refers to the base station table 24 in which base station information including the position information and appliance information on each base station 30 is stored, and acquires the position information on each of the plurality of base stations 30.

Here, FIG. 7 illustrates an example of the base station table 24. In the example in FIG. 7, each record (each row) corresponds to one piece of the base station information. Each piece of the base station information includes items of "base station ID", "position information" represented by the latitude and longitude of the base station 30, "communication instrument type name" of a communication instrument used in the base station 30, "band" indicating the frequency of a radio wave that can be transmitted by the communication instrument, and the like. As information in "band", information indicating whether a radio wave of a specific frequency can be transmitted and the characteristics of the communication instrument that transmits that radio wave is stored for each frequency. In the example in FIG. 7, "1" and "2" represent a case where a radio wave of a specific frequency can be transmitted. In the case of "2", it is represented that the communication instrument that transmits a radio wave of a specific frequency has high performance, such as that the transmission strength of the radio wave of the specific frequency is strong, or the transmission angle can be adjusted.

In addition, with reference to the communication record table 22, the extraction unit 14 estimates the position of the communication terminal 40 as the transmission destination of the message at scheduled transmission date and time at which the message based on the message transmission request is to be transmitted from the base station 30. For example, the extraction unit 14 can estimate the position of the communication terminal 40 from the communication record table 22 according to the route of the ship 42 obtained by placing the reception positions included in "communication status" stored in association with the ship ID of the ship 42 carrying the communication terminal 40 as the transmission destination, on a map in chronological order. When the ACK transmitted from the communication terminal 40 includes tidal current information, sea temperature information, and the like at the time of receiving the message at the communication terminal 40, these pieces of information may also be used for estimating the position of the communication terminal 40.

The extraction unit 14 extracts, as a base station candidate, a base station 30 other than a base station 30 that includes a point at which the radio wave characteristic based on longitude information changes at the scheduled transmission date and time of the message, between the position of the base station 30 and the position of the communication terminal 40. For example, the extraction unit 14 ascertains the distinction between the day and the night at the estimated position of the communication terminal 40 at the scheduled transmission date and time of the message. This ascertainment can be made by referring to, for example, a table that defines the sunrise time and the sunset time for each day of month of year at each point. In detail, for example, the extraction unit 14 can make ascertainment as "day" when the scheduled transmission date and time of the message is included in a time period from the sunrise time to the sunset time, while making ascertainment as "night" when the scheduled transmission date and time of the message is included in a time period from the sunset time to the sunrise time.

Likewise for the position of each of the plurality of base stations 30, the extraction unit 14 ascertains the distinction between the day and the night at each base station 30 at the scheduled transmission date and time of the message. Then, the extraction unit 14 extracts, as a base station candidate, a base station 30 at which the distinction between the day and the night is identical to the distinction between the day and the night at the estimated position of the communication terminal 40.

For example, it is assumed that the distinction between the day and the night at each point at the scheduled transmission date and time of the message is in the state illustrated in FIG. 8. In the example in FIG. 8, the estimated position of the communication terminal 40 is included in an area constituted by points where the distinction between the day and the night is ascertained as night (hereinafter also referred to as "night area"). The positions of the base stations 30D, 30E, and 30F are also included in the night area. On the other hand, the positions of the base stations 30A, 30B, and 30C are included in an area constituted by points where the distinction between the day and the night is ascertained as day (hereinafter also referred to as "day area"). In this case, the extraction unit 14 extracts the base stations 30D, 30E, and 30F as base station candidates.

Furthermore, the extraction unit 14 excludes, from the extracted base station candidates, a base station candidate having a possibility of entering an area where the distinction between the day and the night is different from the distinction in an area including the estimated position of the communication terminal 40, within a predetermined time from the scheduled transmission date and time of the message, thereby extracting a final base station candidate. In FIG. 8, for example, in a case where the base station 30D enters the day area within a predetermined time from the scheduled transmission date and time of the message, the extraction unit 14 excludes the base station 30D from the base station candidate and extracts the base stations 30E and 30F as the final base station candidates. The extraction unit 14 notifies the determination unit 16 of the base station ID of the extracted base station candidate.

On the basis of a criterion defined in advance, the determination unit 16 narrows down the base station candidates indicated by the base station IDs extracted by the extraction unit 14 into a base station candidate highly likely to successfully communicate with the communication terminal 40. For example, the presence or absence of a communication log, the characteristics of the communication appliance, or the like can be used as the criterion defined in advance.

For example, the determination unit 16 refers to the communication log stored in the communication log DB 26 and finds out the presence or absence of the communication log. For example, the determination unit 16 finds out, for each base station candidate, whether there is a communication log for a point equivalent to the estimated position of the communication terminal 40 as the transmission destination of the message, of which the communication calendar day and the communication time slot are close to the scheduled transmission date and time of the message.

Here, an example of the communication log stored in the communication log DB 26 will be described. For example, a communication quality table 26A as illustrated in FIG. 9 can be stored in the communication log DB 26. The communication quality table 26A illustrated in FIG. 9 is a table that stores the quality of communication with the communication terminal 40 at a specific point by communication time slot during which communication was performed, for every point specified by a predetermined latitude and longitude, for each base station 30, for each frequency, and for each communication calendar day (year, month, day). In the example in FIG. 9, the quality of communication is expressed by an evaluation value obtained by evaluating the communication strength in five stages. In addition, a case where there is no recording of the quality of communication represents that there is no communication log with the communication terminal 40 at a relevant point in a relevant communication time slot. Such a communication quality table 26A can be created, for example, on the basis of the communication record table 22 described above.

In the communication quality table 26A, the determination unit 16 specifies a base station candidate for which there is a communication log for a point equivalent to the estimated position of the communication terminal 40 as the transmission destination, of which the communication calendar day and the communication time slot are close to the scheduled transmission date and time of the message. The case where the communication calendar day is close to the scheduled transmission date and time of the message can be regarded that, for example, the month and day of the communication calendar day of the communication log is identical to the month and day of the scheduled transmission date and time or a difference between the communication calendar day of the communication log and the scheduled transmission date and time falls within a predetermined range (for example, a difference of approximately seven days). The case where the communication time slot is close to the scheduled transmission date and time of the message can be regarded that, for example, the communication time slot includes time coincident with the scheduled transmission date and time or time falling within a predetermined period of time (for example, one hour) before and after the scheduled transmission date and time.

Figure 10:
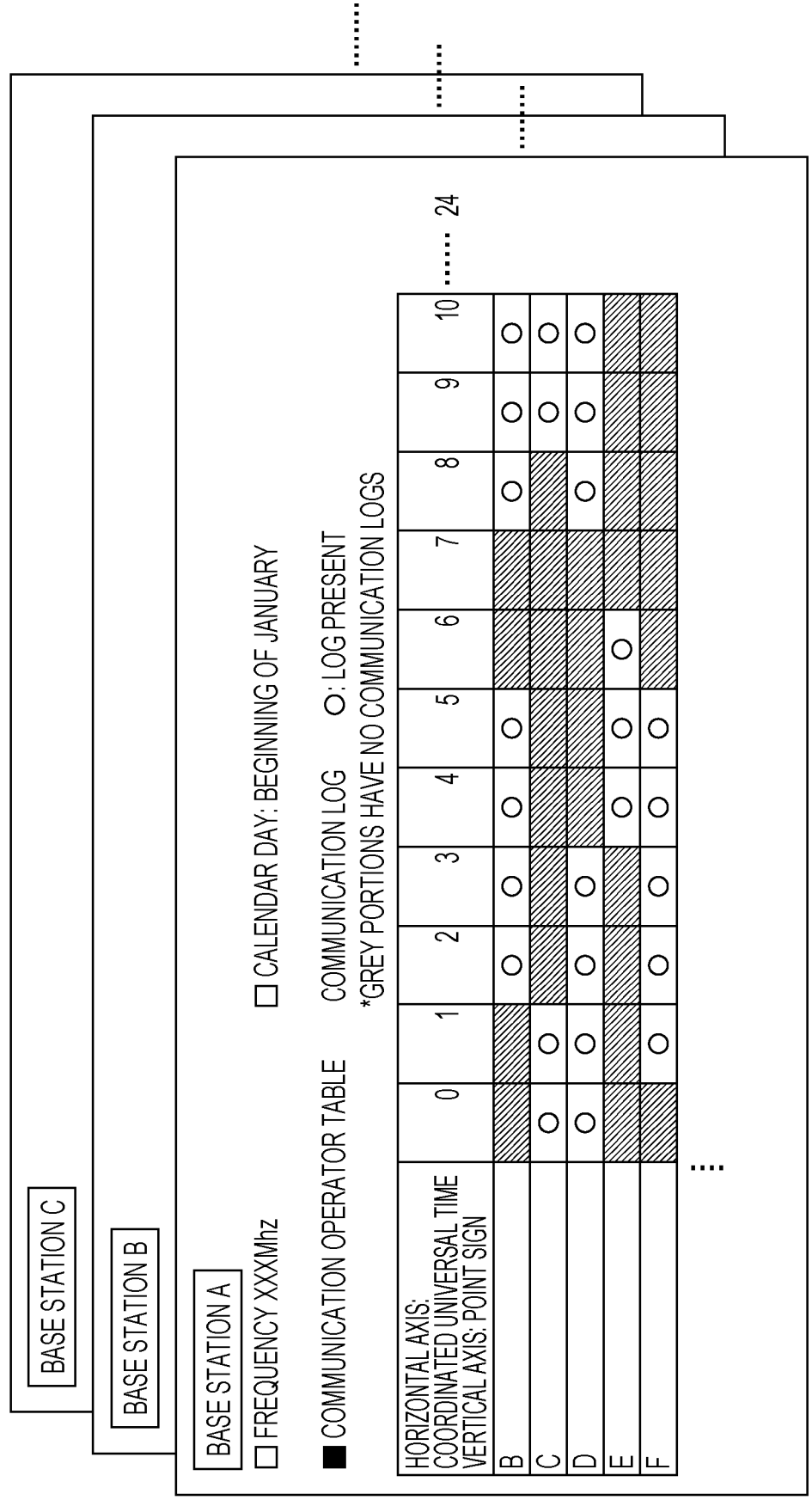
FIG. 10 is a diagram illustrating an example of communication operator tables.

It is also conceivable that data indicating sufficient communication records is not stored in the communication record table 22 and the contents of the communication quality table 26A created from the communication record table 22 are not substantial. Accordingly, for example, a communication operator table 26B created on the basis of the experience of communication operators, as illustrated in FIG. 10 is also stored in the communication log DB 26 and this communication operator table 26B is also used for finding out the presence or absence of the communication log. The communication operator table 26B illustrated in FIG. 10 is a table that stores the presence or absence of the communication log with the communication terminal 40 at each point by communication time slot during which communication was performed, for each base station 30, for each frequency, and for each communication calendar day.

The determination unit 16 refers to the communication operator table 26B for a base station candidate for which there is no corresponding communication log in the communication quality table 26A and confirms whether there is a corresponding communication log for a point equivalent to the estimated position of the communication terminal 40 as the transmission destination. The determination unit 16 specifies a base station candidate for which there is a corresponding communication log in the communication operator table 26B.

The determination unit 16 also specifies, for each base station candidate, which frequency is concerned with the communication log stored in the communication quality table 26A or the communication operator table 26B that has been specified to contain the communication log.

The determination unit 16 refers to the base station table 24 to narrow down the base station candidates that have been specified that the communication logs thereof are present, into a base station candidate having a communication appliance capable of transmitting a radio wave of the specified frequency. For example, it is assumed that the communication quality table 26A for 4 MHz contains corresponding communication logs for each of a base station candidate with the base station ID=A and a base station candidate with the base station ID=B. In this case, for example, referring to the base station table 24 in FIG. 7, the base station candidate with the base station ID=A does not have a communication appliance for transmitting a radio wave of 4 MHz and accordingly is excluded from the base station candidate. On the other hand, since the base station candidate with the base station ID=B has a communication appliance for transmitting a radio wave of 4 MHz, the base station candidate with the base station ID=B still remains as a base station candidate.

The determination unit 16 selects one base station candidate at once from the finally narrowed-down base station candidates to determine the selected base station candidate as the base station 30 that is to transmit the message in response to the message transmission request, and transmits the message transmission instruction. The message transmission instruction includes the ship ID of the ship 42 carrying the communication terminal 40 as the transmission destination, the communication conditions, and the message to be transmitted. The frequency specified from the communication quality table 26A or the communication operator table 26B can be designated as the communication conditions.

When receiving the communication result indicating that the transmission of the message failed from the base station 30 in response to the message transmission instruction, the determination unit 16 repeats the determination of the base station 30 from among the remaining base station candidates and the transmission of the message transmission instruction until a termination condition is satisfied. Examples of the termination condition include a case where a communication result indicating that the transmission of the message was successful has been received from the base station 30, a case where the number of times of repetition of the transmission of the message transmission instruction has reached a predetermined number of times, and a case where the message transmission instruction has been transmitted to all the base station candidates.

On the basis of the communication result transmitted from the base station 30 when the termination condition is satisfied, the determination unit 16 transmits a communication result indicating whether the transmission of the message in response to the message transmission request was successful or failed, to the base station 30 that has transmitted the message transmission request.

When one base station candidate is selected at once from the base station candidates and determined as the base station 30 that is to transmit the message in response to the message transmission request, a base station candidate having a higher priority may be selected in descending order. For example, for a base station candidate for which there is a corresponding communication log in the communication quality table 26A, a higher priority can be given to a higher evaluation value of the communication quality indicated by the communication log. A base station candidate for which there is a corresponding communication log in the communication operator table 26B can be treated on assumption that a certain evaluation value of the communication quality prescribed in the communication quality table 26A (for example, the maximum value, the minimum value, or a value indicating intermediate evaluation) is given thereto. Alternatively, with reference to the base station table 24, a base station candidate having a communication appliance with higher characteristics may be given a higher priority.

Figure 11:
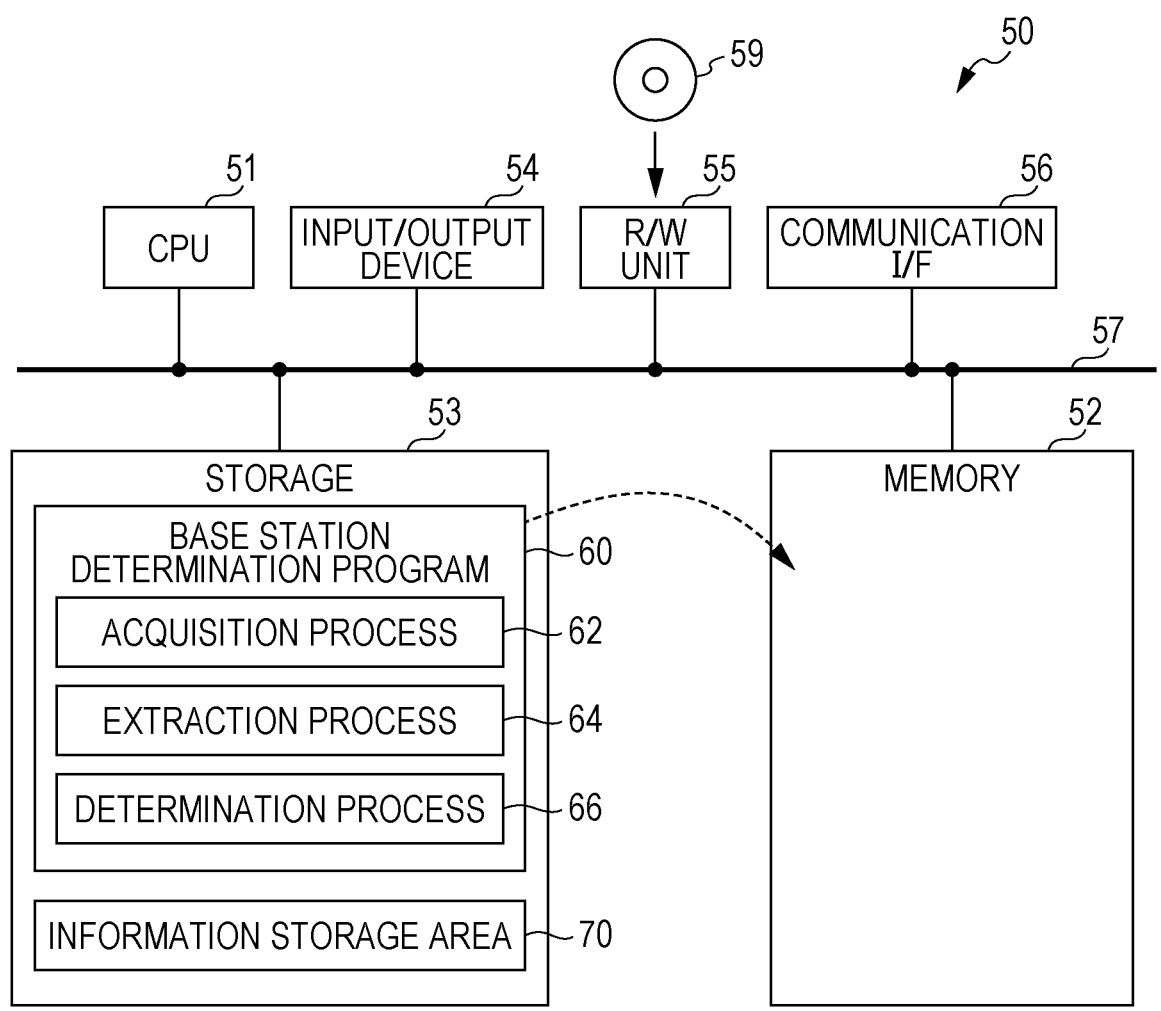
FIG. 11 is a block diagram illustrating a schematic configuration of a computer functioning as the base station determination apparatus according to the present embodiment.

The base station determination apparatus 10 can be implemented, for example, by a computer 50 illustrated in FIG. 11. The computer 50 includes a central processing unit (CPU) 51, a memory 52 as a temporary storage area, and a nonvolatile storage 53. The computer 50 also includes an input/output device 54, a read/write (R/W) unit 55 that controls reading and writing of data to and from a storage medium 59, and a communication interface (I/F) 56 connected to a network such as the Internet. The CPU 51, the memory 52, the storage 53, the input/output device 54, the R/W unit 55, and the communication I/F 56 are connected to each other via a bus 57.

The storage 53 can be implemented by a hard disk drive (HDD), a solid state drive (SSD), a flash memory, or the like. A base station determination program 60 for causing the computer 50 to function as the base station determination apparatus 10 is stored in the storage 53 as a storage medium. The base station determination program 60 has an acquisition process 62, an extraction process 64, and a determination process 66. The storage 53 has an information storage area 70 in which information constituting each of the communication record table 22, the base station table 24, and the communication log DB 26 is stored.

The CPU 51 reads out the base station determination program 60 from the storage 53 to develop in the memory 52 and sequentially executes the processes included in the base station determination program 60. The CPU 51 executes the acquisition process 62 to work as the acquisition unit 12 illustrated in FIG. 5. The CPU 51 executes the extraction process 64 to work as the extraction unit 14 illustrated in FIG. 5. The CPU 51 executes the determination process 66 to work as the determination unit 16 illustrated in FIG. 5. The CPU 51 also reads out information from the information storage area 70 and develops each of the communication record table 22, the base station table 24, and the communication log DB 26 in the memory 52. With these procedures, the computer 50 executing the base station determination program 60 functions as the base station determination apparatus 10.

Functions implemented by the base station determination program 60 can also be implemented, for example, by a semiconductor integrated circuit, in more detail, an application specific integrated circuit (ASIC) or the like.

Next, the action of the communication system 100 according to the present embodiment will be described.

First, at periodic timings, the acquisition unit 12 designates the communication conditions including the transfer speed and the frequency at the time of transmitting the message and transmits, to each base station 30, the message transmission instruction for causing each base station 30 to transmit the message for periodically acquiring the position information to the communication terminal 40. Then, each base station 30 broadcasts the message under the communication conditions designated by the message transmission instruction. The communication terminal 40 that has received this message sends back the ACK including the position information on the ship 42 carrying the communication terminal 40 to the base station 30, which is the transmission source of the message and, in turn, the base station 30 transmits the communication result including information on this ACK to the base station determination apparatus 10. The acquisition unit 12 stores the information included in the received communication result in association with each item of the communication record table 22. Consequently, the position information on the communication terminal 40 is acquired.

Then, when it is desired to reliably transmit a message from the base station 30 to the communication terminal 40, such as when it is desired to transmit an urgent and important message, the base station determination apparatus 10 determines the base station 30 that is to transmit the message from among the plurality of base stations 30 and thereafter executes a process of causing the determined base station 30 to transmit the message. The exchange of information in this process between the base station determination apparatus 10, the base station 30A with the base station ID=A, the base station 30F with the base station ID=F, and the communication terminal 40 carried on the ship 42 with the ship ID=001A will be described with reference to a sequence diagram illustrated in FIG. 12. The details of a base station determination process executed by the base station determination apparatus 10 will be explained precisely with reference to FIG. 13 described later.

First, the base station 30A desired to transmit a message to the communication terminal 40 carried on the ship 42 with the ship ID=001A transmits, to the base station determination apparatus 10, a message transmission request including the ship ID=001A, the base station ID=A, and the message to be transmitted (S5).

Upon receiving the message transmission request, the base station determination apparatus 10 starts the base station determination process (S10) of which the details will be described later. Then, in the base station determination apparatus 10, the base station 30 that is to transmit the message in response to the message transmission request is determined. It is assumed here that the base station 30F is determined as the base station 30 that is to transmit the message in response to the message transmission request. The base station determination apparatus 10 transmits, to the base station 30F, a message transmission instruction including the ship ID=001A, the communication conditions, and the message to be transmitted (S19).

Upon receiving the message transmission instruction, the base station 30F transmits the message designated by the message transmission instruction to the designated communication terminal 40 under the designated communication conditions (S31). The communication terminal 40 that has received the message sends the ACK to the base station 30F as a reply (S32).

The base station 30F that has received the ACK transmits, to the base station determination apparatus 10, the communication result including the message ID, the communication conditions at the time of transmitting the message, the base station ID=F, the transmission date and time of the message, the ship ID=001A, the communication status including the information on the ACK, and the like (S33). Upon receiving this communication result, the base station determination apparatus 10 transmits the communication result indicating that the transmission of the message in response to the message transmission request was successful, to the base station 30A that has transmitted the message transmission request (S22).

When the transmission of the message from the base station 30F to the communication terminal 40 has failed, the base station determination apparatus 10 receives, from the base station 30F, the communication result indicating that the transmission of the message failed. Then, the base station determination apparatus 10 repeats the determination of the base station 30 from among the remaining base station candidates and the transmission of the message transmission instruction until the termination condition is satisfied. When the transmission of the message to the communication terminal 40 is not successful even after the repetition until the termination condition is satisfied, the base station determination apparatus 10 transmits, to the base station 30A, the communication result indicating that the transmission of the message in response to the message transmission request failed.

Figure 12:
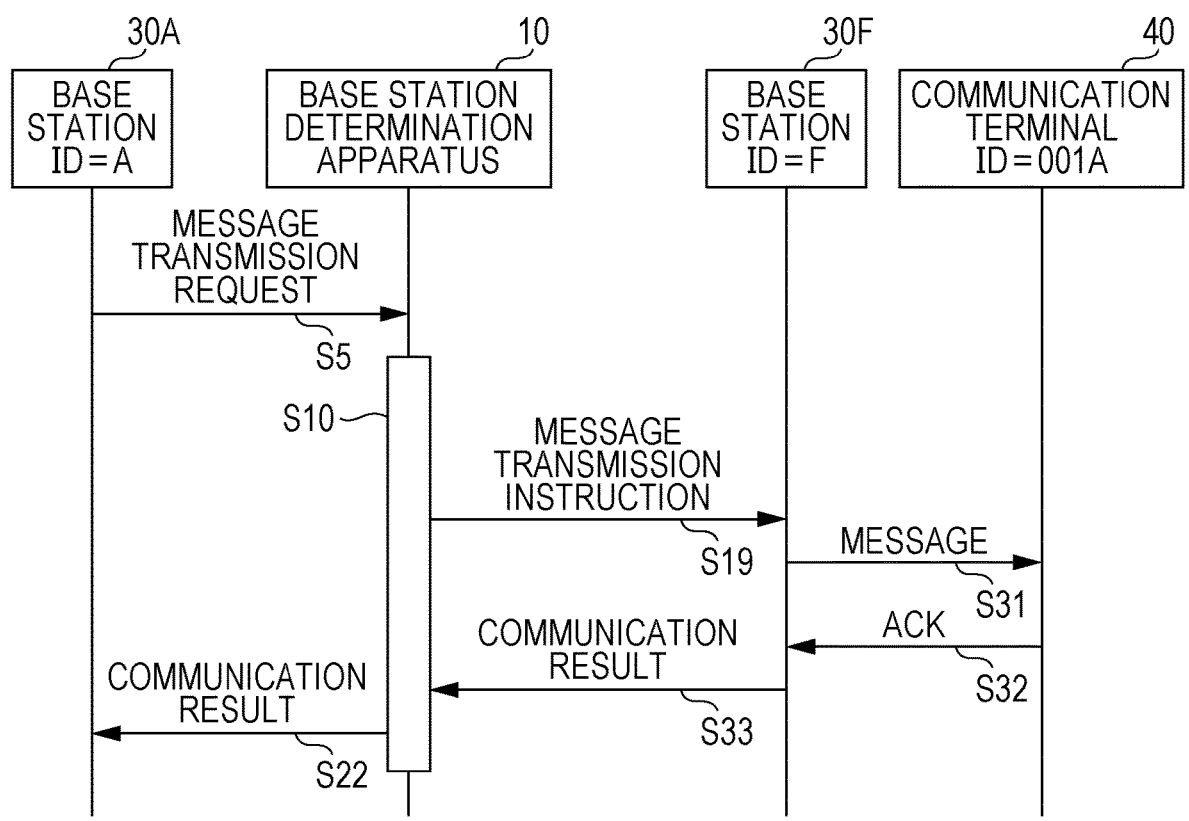
FIG. 12 is a sequence diagram illustrating exchange of information between the base station determination apparatus, the base station, and the communication terminal.
Figure 13:
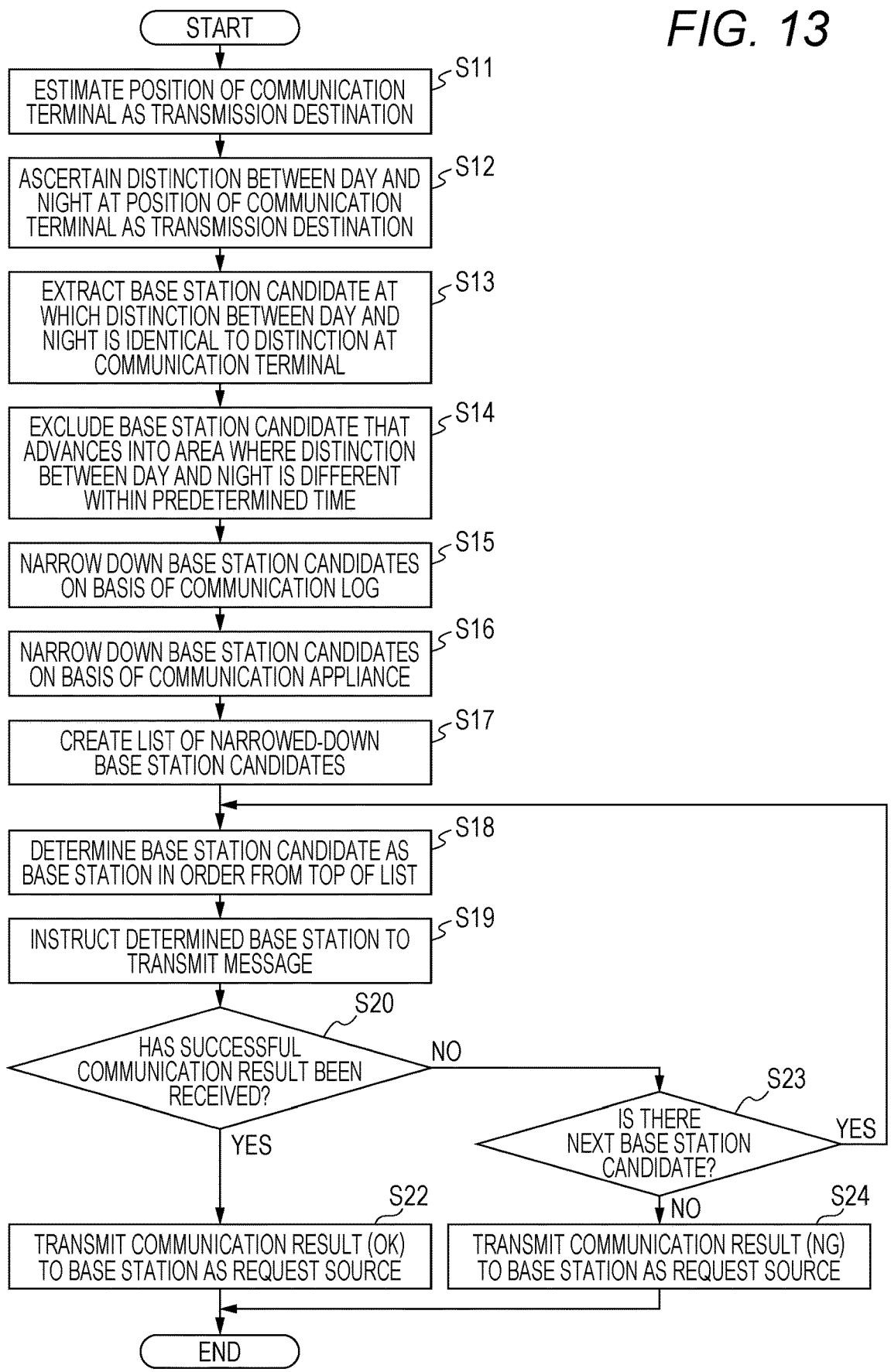
FIG. 13 is a flowchart illustrating an example of a base station determination process.

Next, the base station determination process executed by the base station determination apparatus 10 will be described with reference to FIG. 13. As in the case of FIG. 12, FIG. 13 will also describe a case where it is desired to transmit a message from the base station 30A with the base station ID=A to the communication terminal 40 carried on the ship 42 with the ship ID=001A and the base station 30F with the base station ID=F is assigned as one of the base station candidates. The base station determination process is executed in the base station determination apparatus 10 when the base station determination apparatus 10 receives the message transmission request transmitted from the base station 30A. In the base station determination process illustrated in FIG. 13, processes similar to those in the sequence diagram illustrated in FIG. 12 are denoted by the same reference numerals.

In step S11, the extraction unit 14 acquires, for example, from the communication record table 22, the reception position included in the communication status stored in association with the ship ID=001A included in the message transmission request transmitted from the base station 30A. Then, the extraction unit 14 estimates the position of the communication terminal 40 carried on the ship 42 with the ship ID=001A at the scheduled transmission date and time of the message, according to the route obtained by placing the acquired reception positions on a map in chronological order.

Next, in step S12, the extraction unit 14 refers to a table or the like that defines the sunrise time and the sunset time for each day of month of year at each point and ascertains the distinction between the day and the night at the scheduled transmission date and time of the message at the position of the communication terminal 40 estimated in step S11 above. This example assumes that the estimated position of the communication terminal 40 is ascertained to be included in the night area as illustrated in FIG. 8.

Next, in step S13, the extraction unit 14 refers to the base station table 24 and acquires the position information on each of the plurality of base stations 30. Then, as in the process of step S12 above, the extraction unit 14 ascertains the distinction between the day and the night at the scheduled transmission date and time of the message for the position of each of the plurality of base stations 30. Subsequently, the extraction unit 14 extracts, as a base station candidate, a base station 30 at which the distinction between the day and the night is identical to the distinction between the day and the night at the estimated position of the communication terminal 40 ascertained in step S12 above. This example assumes that the base stations 30D, 30E, and 30F present in the night area at the scheduled transmission date and time of the message are extracted as base station candidates.

Next, in step S14, the extraction unit 14 excludes, from the extracted base station candidates, a base station candidate having a possibility of entering an area where the distinction between the day and the night is different from the distinction in an area including the estimated position of the communication terminal 40, within a predetermined time from the scheduled transmission date and time of the message. This example assumes that the base station 30D enters the day area within the predetermined time from the scheduled transmission date and time of the message. In this case, the base stations 30E and 30F are extracted as final base station candidates. The extraction unit 14 notifies the determination unit 16 of the base station ID of the extracted base station candidate.

Next, in step S15, the determination unit 16 refers to the communication quality table 26A and the communication operator table 26B to find out whether there is a corresponding communication log for each base station candidate. The corresponding communication log is a communication log for a point equivalent to the estimated position of the communication terminal 40 as the transmission destination of the message, of which the communication calendar day and the communication time slot are close to the scheduled transmission date and time of the message. Then, the determination unit 16 narrows down the base station candidates extracted in step S14 above into a base station candidate for which the corresponding communication log is present. The determination unit 16 also specifies, for each base station candidate, which frequency is concerned with the communication log stored in the communication quality table 26A or the communication operator table 26B that has been specified to contain the communication log.

Next, in step S16, the determination unit 16 refers to the base station table 24 to narrow down the base station candidates that have been specified that the communication logs thereof are present, into a base station candidate having a communication appliance capable of transmitting a radio wave of the frequency specified in step S15 above.

Next, in step S17, the determination unit 16 creates a list in which the base station IDs of the base station candidates narrowed down in step S16 above are recorded. At this time, the determination unit 16 gives priority to each base station candidate on the basis of the evaluation value in the communication quality table 26A used for narrowing down the base station candidates and the characteristics of the communication appliance situated in the base station candidate, and records the base station candidates in the list in descending order of priority. This example assumes that the base station ID=F of the base station 30F and the base station ID=E of the base station 30E are recorded in the list in this order.

Next, in step S18, the determination unit 16 selects one base station candidate at the top of the list created in step S17 above and determines the selected base station candidate as the base station 30 that is to transmit the message in response to the message transmission request. In this example, the base station 30F indicated by the base station ID=F at the top of the list is determined as the base station 30 that is to transmit the message in response to the message transmission request.

Next, in step S19, the determination unit 16 transmits the message transmission instruction including the ship ID=001A, the communication conditions, and the message to be transmitted, to the base station 30F determined in step S18 above as the base station 30 that is to transmit the message in response to the message transmission request.

Next, in step S20, it is ascertained whether the communication result indicating that the transmission of the message was successful has been received from the base station 30F. When the communication result indicating that the transmission of the message was successful has been received, the process proceeds to step S22. When the communication result received from the base station 30F is the communication result indicating that the transmission of the message failed, the process proceeds to step S23.

In step S22, the determination unit 16 transmits the communication result indicating that the transmission of the message in response to the message transmission request was successful, to the base station 30A that has transmitted the message transmission request and the base station determination process is terminated. The determination unit 16 may store information included in the communication result received in this step in the communication record table 22.

On the other hand, in step S23, the determination unit 16 ascertains whether the list created in step S17 above contains a base station candidate that has not yet been determined as the base station 30 that is to transmit the message in response to the message transmission request. In this example, since the base station 30E is still on the list, an affirmative ascertainment is made and the process returns to step S18. When the transmission of the message to the communication terminal 40 was not successful also by the base station 30E, a negative ascertainment is made in step S20 above and the process proceeds to step S23. In this case, since the list contains no base station candidate to be determined next as the base station 30 that is to transmit the message in response to the message transmission request, a negative ascertainment is made and the process proceeds to step S24.

In step S24, the determination unit 16 transmits the communication result indicating that the transmission of the message in response to the message transmission request failed, to the base station 30A that has transmitted the message transmission request and the base station determination process is terminated.

As described thus far, according to the base station determination apparatus of the present embodiment, a base station other than a base station that includes a point at which the radio wave characteristic based on longitude information changes, between the position of the base station and the position of the communication terminal as the transmission destination of the message is extracted as the base station candidate from among the plurality of base stations. For example, at the scheduled transmission time of the message, a base station at which the distinction between the day and the night is identical to the distinction between the day and the night at the position of the communication terminal as the transmission destination is extracted as a base station candidate. From among the extracted base station candidates, a base station that is to transmit the message in response to the message transmission request from another base station is suitably determined without using the communication log. Therefore, a base station capable of performing highly reliable communication even with a communication terminal at a position with inadequate communication logs is suitably determined.

In addition, a base station candidate that enters an area in which the distinction between the day and the night is different, within a predetermined time from the scheduled transmission time of the message is excluded from the base station candidate. With this procedure, it becomes easier to reduce a situation in which, even if the distinction between the day and the night is identical to the distinction at the communication terminal at the scheduled transmission time, the distinction between the day and the night becomes different during the transmission of the message and the communication is shut off as a consequence.

Furthermore, by narrowing down the base station candidates on the basis of the presence or absence of the communication log and the characteristics of the communication appliance, a base station capable of further improving the reliability of the communication is suitably determined.

Note that, in the above embodiment, the description has been given of a case where both of the narrowing-down based on the presence or absence of the communication log and the narrowing-down based on the characteristics of the communication appliance are performed in addition to the extraction of the base station candidate according to the distinction between the day and the night; however, the present invention is not limited thereto. The narrowing-down based on the presence or absence of the communication log and the narrowing-down based on the characteristics of the communication appliance may not be performed, or one of the narrowing-down procedures may be selectively performed. In a case where the narrowing-down based on the characteristics of the communication appliance is selectively performed, the corresponding frequency may be specified by a separate way, or the communication quality table and the communication operator table may be used exclusively for specifying the corresponding frequency. In addition, regardless of the frequency, the base station table may be referred to such that a base station candidate having an appliance with higher characteristics is narrowed down.

The above embodiment has described a case where both of the communication quality table and the communication operator table are used as the narrowing-down based on the presence or absence of the communication log; however, the presence or absence of the corresponding communication log may be found out using one of the tables exclusively.

In addition, in the above embodiment, the communication record table may be referred to in order to determine the communication conditions at the time of transmitting the message from the base station.

For example, the base station 30 transmits a communication condition inquiry to the base station determination apparatus 10 when the ACK is not received from the communication terminal 40, which is the transmission destination of the message, within a predetermined time. The communication condition inquiry includes information on the ship ID of the ship 42 carrying the communication terminal 40, which is the transmission destination of the message, the base station ID of the base station 30 (local device), and the scheduled transmission time of the message.

The base station determination apparatus 10 refers to the communication record table 22 and acquires communication conditions optimum for the inquiry. For example, when a communication record related to communication in the same time slot with the communication terminal 40 carried on the ship 42 indicated by the ship ID included in the communication condition inquiry is stored in the communication record table 22, the base station determination apparatus 10 acquires communication conditions similar to those for the communication in the same time slot. In more detail, for example, the base station determination apparatus 10 specifies, from the communication record table 22, a communication record of which "base station ID" is identical to the base station ID included in the communication condition inquiry and "transmission date and time" is included in a predetermined range with the time included in the communication condition inquiry as a reference. Then, the base station determination apparatus 10 acquires communication conditions ("transfer speed" and "frequency") included in the specified communication record. When a plurality of communication records has been specified, the base station determination apparatus 10 acquires each of a plurality of communication conditions included in each of the plurality of communication records. Alternatively, the base station determination apparatus 10 may select and acquire, from among the specified communication records, a communication record of which "transmission date and time" is the latest or the reception position included in "communication status" is nearest to the estimated position of the communication terminal 40 as the transmission destination of the message.

The base station can select communication conditions matching the communication conditions transmitted from the base station determination apparatus or similar communication conditions from among a plurality of types of communication conditions according to a communication appliance situated in this base station. By determining the communication conditions on the basis of the communication record table, the communication conditions when the communication was successful in the past can be used and the probability that the transmission of the message will be successful increases. In addition, repeating the transmission of the message while properly modifying the communication conditions improves the reliability that the transmission of the message is completed.

In the above embodiment, communication between the communication terminal carried on the ship moving on the sea and the base station has been described as an example, but the present invention is not limited to this embodiment. The disclosed technology can also be applied to communication between a mobile body such as an airplane traveling in the sky and the base station, and communication between a communication terminal present on the ground such as mountains, deserts, or wide factories and the base station.

In the above embodiment, a case where the communication between the communication terminal and the base station is communication using the shortwave frequency has been described as an example; however, as long as the communication technique utilizes the ionospheric reflection, the application effect of the disclosed technology is exerted.

In the above description, a mode in which the base station determination program 60, which is an example of the program according to the disclosed technology, is stored (installed) in advance in the storage 53 has been described, but the present invention is not limited to this mode. The program according to the disclosed technology can also be provided in a form stored in a storage medium such as a compact disc read only memory (CD-ROM), a digital versatile disc read only memory (DVD-ROM), or a universal serial bus (USB) memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a base station determination program for causing a computer to execute a process comprising:
    acquiring position information on a communication terminal;
    assigning, based on position information on each of a plurality of base stations stored in advance in a storage and the acquired position information on the communication terminal, one or more base stations other than a base station that includes a point at which a radio wave characteristic based on longitude information changes in a time slot during which communication is to be performed, and which is provided between a position of the base station and a position of the communication terminal, as one or more base station candidates from among the plurality of base stations; and
    determining a base station that is to communicate with the communication terminal from among the one or more base station candidates.

2. The non-transitory computer-readable recording medium according to claim 1, wherein the radio wave characteristic based on the longitude information is a reflection characteristic of a radio wave in an ionosphere which varies according to sunrise or sunset.

3. The non-transitory computer-readable recording medium according to claim 1, wherein the one or more base station candidates are a base station having distinction indicating whether the time slot during which communication is to be performed at a position of the respective one or more base station candidates is during a day from sunrise to sunset or during a night from sunset to sunrise is the same as distinction at the position of the communication terminal.

4. The non-transitory computer-readable recording medium according to claim 1, wherein, when the base station that is to communicate with the communication terminal is determined from among the one or more base station candidates, determination is made based on a criterion for reliability that communication with the communication terminal is established.

5. The non-transitory computer-readable recording medium according to claim 4, wherein presence or absence of a communication log between each of the one or more base station candidates and a point equivalent to the position of the communication terminal is used as the criterion, and a base station candidate having a communication log of which a communication calendar day and a communication time slot are close to the time slot during which communication is to be performed with the communication terminal is determined as the base station that is to communicate with the communication terminal.

6. The non-transitory computer-readable recording medium according to claim 4, wherein information on a communication appliance of each of the one or more base station candidates is used as the criterion, and a base station candidate that holds a communication appliance suitable for communication with the communication terminal is determined as the base station that is to communicate with the communication terminal.

7. The non-transitory computer-readable recording medium according to claim 1, wherein a base station candidate having a possibility that the point at which the radio wave characteristic based on the longitude information changes enters between a position of the base station candidate and the position of the communication terminal within a predetermined time from the time slot during which communication is to be performed is excluded from the one or more base station candidates.

8. The non-transitory computer-readable recording medium having according to claim 1, wherein
    acquiring the position information on the communication terminal includes acquiring position information included in a communication record at the time of establishment of communication between the base station and the communication terminal, and
    a position of the communication terminal in the time slot during which communication is to be performed is estimated based on the position information acquired from the communication record.

9. An information processing apparatus comprising:
    a memory; and
    a processor coupled to the memory and configured to execute a process of:
    acquiring position information on a communication terminal; and
    assigning, based on position information on each of a plurality of base stations stored in advance in a storage and the acquired position information on the communication terminal, one or more base stations other than a base station that includes a point at which a radio wave characteristic based on longitude information changes in a time slot during which communication is to be performed, and which is provided between a position of the base station and a position of the communication terminal, as one or more base station candidates from among the plurality of base stations; and
    determining a base station that is to communicate with the communication terminal from among the one or more base station candidates.

10. The information processing apparatus according to claim 9, wherein the radio wave characteristic based on the longitude information is a reflection characteristic of a radio wave in an ionosphere which varies according to sunrise or sunset.

11. The information processing apparatus according to claim 9, wherein the one or more base station candidates are a base station having distinction indicating whether the time slot during which communication is to be performed at a position of the respective one or more base station candidates is during a day from sunrise to sunset or during a night from sunset to sunrise is the same as distinction at the position of the communication terminal.

12. The information processing apparatus according to claim 1, wherein, when the base station that is to communicate with the communication terminal is determined from among the one or more base station candidates, determination is made based on a criterion for reliability that communication with the communication terminal is established.

13. The information processing apparatus according to claim 12, wherein presence or absence of a communication log between each of the one or more base station candidates and a point equivalent to the position of the communication terminal is used as the criterion, and a base station candidate having a communication log of which a communication calendar day and a communication time slot are close to the time slot during which communication is to be performed with the communication terminal is determined as the base station that is to communicate with the communication terminal.

14. The information processing apparatus according to claim 12, wherein information on a communication appliance of each of the one or more base station candidates is used as the criterion, and a base station candidate that holds a communication appliance suitable for communication with the communication terminal is determined as the base station that is to communicate with the communication terminal.

15. The information processing apparatus according to claim 9, wherein a base station candidate having a possibility that the point at which the radio wave characteristic based on the longitude information changes enters between a position of the base station candidate and the position of the communication terminal within a predetermined time from the time slot during which communication is to be performed is excluded from the one or more base station candidates.

16. The information processing apparatus having according to claim 9, wherein acquiring the position information on the communication terminal includes acquiring position information included in a communication record at the time of establishment of communication between the base station and the communication terminal, and a position of the communication terminal in the time slot during which communication is to be performed is estimated based on the position information acquired from the communication record.

17. A base station determination method comprising:
acquiring, by a computer, position information on a communication terminal;
assigning, based on position information on each of a plurality of base stations stored in advance in a storage and the acquired position information on the communication terminal, one or more base stations other than a base station that includes a point at which a radio wave characteristic based on longitude information changes in a time slot during which communication is to be performed, and which is provided between a position of the base station and a position of the communication terminal, as one or more base station candidates from among the plurality of base stations; and
determining a base station that is to communicate with the communication terminal from among the one or more base station candidates.

18. The base station determination method according to claim 17, wherein the radio wave characteristic based on the longitude information is a reflection characteristic of a radio wave in an ionosphere which varies according to sunrise or sunset.

19. The base station determination method according to claim 17, wherein the one or more base station candidates are a base station having distinction indicating whether the time slot during which communication is to be performed at a position of the respective one or more base station candidates is during a day from sunrise to sunset or during a night from sunset to sunrise is the same as distinction at the position of the communication terminal.

20. The base station determination method according to claim 17, wherein, when the base station that is to communicate with the communication terminal is determined from among the one or more base station candidates, determination is made based on a criterion for reliability that communication with the communication terminal is established.

* * * * *